United States Patent
Cheng (10) Patent No.: US 10,842,324 B2
(45) Date of Patent: Nov. 24, 2020

(54) LADLE AND CONTAINER SYSTEM

(71) Applicant: Meyer Intellectual Properties Ltd., Kowloon (HK)

(72) Inventor: Stanley Kin Sui Cheng, Hillsborough, CA (US)

(73) Assignee: Meyer Intellectual Properties Ltd.

( * ) Notice: Subject to any disclaimer, the term of this patent is extended or adjusted under 35 U.S.C. 154(b) by 0 days.

(21) Appl. No.: 16/385,634

(22) Filed: Apr. 16, 2019

(65) Prior Publication Data

US 2019/0343337 A1    Nov. 14, 2019

Related U.S. Application Data (60) Provisional application No. 62/660,077, filed on Apr. 19, 2018.

(51) Int. Cl.
*A47J 43/28* (2006.01)

(52) U.S. Cl.
CPC .................. *A47J 43/285* (2013.01)

(58) Field of Classification Search
CPC .......... A47J 43/285; A47J 43/28; B65D 25/28
USPC .................................................. 220/735, 756
See application file for complete search history.

(56) References Cited

U.S. PATENT DOCUMENTS

| | | | |
|---|---|---|---|
| 3,149,824 A | 9/1964 | Albano | |
| 3,865,023 A | 2/1975 | Halvorsen | |
| 5,894,668 A * | 4/1999 | Cooke | A47J 43/281 30/324 |
| 2001/0045388 A1 | 11/2001 | Ho | |
| 2005/0081385 A1 * | 4/2005 | Ho | A47J 43/14 30/123 |
| 2006/0174494 A1 * | 8/2006 | Wong | A47J 43/284 30/326 |

FOREIGN PATENT DOCUMENTS

| | | | |
|---|---|---|---|
| CN | 2068807 U | * | 1/1991 |
| CN | 201691591 U | | 1/2011 |
| CN | 204862701 U | | 12/2015 |
| CN | 204970683 U | | 1/2016 |

OTHER PUBLICATIONS

International Search Report dated Jul. 31, 2019 issued in connection with PCT/US19/027652.
Written Opinion of the International Searching Authority dated Jul. 31, 2019 issued in connection with PCT/US19/027652.
Search Report dated Mar. 6, 2020 issued in connection with corresponding Taiwanese Patent Application No. 108113475.
First Office Action dated Mar. 6, 2020 issued in connection with corresponding Taiwanese Patent Application No. 108113475.

* cited by examiner

*Primary Examiner* — Anthony D Stashick
*Assistant Examiner* — L Kmet
(74) *Attorney, Agent, or Firm* — Akerman LLP (57) ABSTRACT

According to one example, a system includes a hollow container and a ladle. The hollow container has a first opening at a proximal end, a second opening at an opposing distal end, and a sidewall that extends from the proximal end to the distal end. The first opening is wider than the second opening. The ladle comprises a handle having a proximal end and a distal end, and further comprises a cup coupled to the distal end of the handle. The cup has an inner surface configured to hold a food item. The cup further has an outer surface configured to substantially seal the second opening of the hollow container from within the hollow container.

18 Claims, 9 Drawing Sheets

LADLE AND CONTAINER SYSTEM

CROSS-REFERENCE TO RELATED APPLICATIONS

This application claims priority to U.S. Provisional Patent Application No. 62/660,077 entitled "Ladle Device and Kit" and filed Apr. 19, 2018, the entirety of which is incorporated herein by reference.

TECHNICAL FIELD

This disclosure relates generally to cooking devices, and more specifically to a ladle and container system.

BACKGROUND

Certain food items may develop an undesirable surface layer as they cook. For example, stews and stocks may develop a layer of oil and/or fat as they are cooked (e.g., fat may be rendered from the flesh of the meat, poultry, and/or fish included in the stew or stock as it simmers). As another example, some vegetarian dishes may develop an unpleasant appearing floating scum, or simply an oil layer from butter or cooking oils used to sweat onions or caramelize vegetables (e.g., before adding fluids, like water or stock). Typical methods, devices, and apparatuses for removing this undesirable surface layer, however, may be deficient.

SUMMARY

In a first example, a system comprises: a hollow container having a first opening at a proximal end, a second opening at an opposing distal end, and a sidewall that extends from the proximal end to the distal end, the first opening being wider than the second opening; and a ladle comprising a handle having a proximal end and a distal end, the ladle further comprising a cup coupled to the distal end of the handle, the cup having a concave inner surface configured to hold a food item, the cup further having a convex outer surface configured to substantially seal the second opening of the hollow container from within the hollow container, wherein a portion of the handle is removably attachable to a portion of the hollow container to selectively hold the cup of the ladle in a position where the convex outer surface substantially seals the second opening of the hollow container, wherein the proximal end of the handle is configured to extend outward out of and past the first opening of the hollow container when the second opening of the hollow container is substantially sealed by the outer surface of the cup.

In a second example, a system comprises: a hollow container having a first opening at a proximal end, a second opening at an opposing distal end, and a sidewall that extends from the proximal end to the distal end, the first opening being wider than the second opening; and a ladle comprising a handle having a proximal end and a distal end, the ladle further comprising a cup coupled to the distal end of the handle, the cup having an inner surface configured to hold a food item, the cup further having an outer surface configured to substantially seal the second opening of the hollow container from within the hollow container.

Another example is any such system, wherein the inner surface of the cup is a concave inner surface. Another example is any such system, wherein the outer surface of the cup is a convex outer surface.

Another example is any such system, wherein a portion of the outer surface of the cup has a cross sectional shape and size that matches the shape and size of the second opening of the hollow container. Another example is any such system, wherein a portion of the handle is removably attachable to a portion of the hollow container to selectively hold the cup of the ladle in a position where the outer surface substantially seals the second opening of the hollow container. Another example is any such system, wherein the handle includes a knob that extends outward from the external surface of the handle, wherein the knob is configured to removably fit within a hole in the sidewall of the hollow container so as to hold the cup of the ladle in a position where the outer surface substantially seals the second opening of the hollow container. Another example is any such system, wherein the hollow container includes a notch at the proximal end of the hollow container, wherein a gasket is positioned within the notch, wherein the handle includes a knob that extends outward from the external surface of the handle, wherein the knob is configured to removably fit within a hole in the gasket so as to hold the cup of the ladle in a position where the outer surface substantially seals the second opening of the hollow container.

Another example is any such system, wherein the sidewall of the hollow container is curvilinear. Another example is any such system, wherein the sidewall of the hollow container is non-curvilinear.

Another example is any such system, wherein the hollow container further includes a bottom coupled to the sidewall at the distal end of the hollow container, wherein the second opening is positioned within the bottom of the hollow container.

Another example is any such system, wherein the proximal end of the handle is configured to extend outward out of and past the first opening of the hollow container when the second opening of the hollow container is substantially sealed by the outer surface of the cup.

Another example is any such system, wherein the cup includes a pouring spout.

Another example is any such system, wherein the hollow container includes a flange that extends laterally out from the sidewall, wherein the ladle includes a segment that extends laterally out from the external surface of the handle, wherein the flange and the segment are configured to be held or squeezed together by a user so as to hold the cup of the ladle in a position where the outer surface substantially seals the second opening of the hollow container. Another example is any such system, wherein the hollow container includes a handle, wherein the ladle includes a connecting segment, wherein a portion of the connecting segment is configured to be moved underneath the handle so as to hold the cup of the ladle in a position where the outer surface substantially seals the second opening of the hollow container.

In a third example, a method comprises: substantially sealing a second opening of a hollow container from within the hollow container with an outer surface of a cup of a ladle, wherein the hollow container has a first opening at a proximal end, the second opening at an opposing distal end, and a sidewall that extends from the proximal end to the distal end, wherein the first opening is wider than the second opening, wherein the ladle comprises a handle having a proximal end and a distal end, wherein the ladle further comprises the cup coupled to the distal end of the handle, the cup having an inner surface configured to hold a food item, the cup further having the outer surface; positioning at least the second opening of the hollow container below a surface layer of a food item held within a cooking pot or vessel; releasing the substantial seal of the second opening while at least the second opening of the hollow container is positioned below the surface layer of the food item held within the cooking pot or vessel, wherein the releasing of the substantial seal causes a portion of the food item to move into the hollow container through the second opening; and retrieving at least a part of the portion of the food item from within the hollow container with the inner surface of the cup of the ladle.

Another example is any such method, wherein substantially sealing the second opening of the hollow container comprises removably attaching a portion of the handle to a portion of the hollow container to selectively hold the cup of the ladle in a position where the outer surface substantially seals the second opening of the hollow container.

Another example is any such method, further comprising positioning the cup of the ladle within the hollow container prior to substantially sealing the second opening of the hollow container from within the hollow container with the outer surface of the cup of the ladle.

Another example is any such method, wherein the inner surface of the cup is a concave inner surface, and wherein the outer surface of the cup is a convex outer surface.

Another example is any such method, wherein a portion of the outer surface of the cup has a cross sectional shape and size that matches the shape and size of the second opening of the hollow container.

In a fourth example, a ladle is adapted engage the interior distal end opening of a tubular member that is also open at the proximal end. The tube can be inserted into a stock pot such that the ladle's convex side seals the distal opening until it is below any floating layer of oils or crust. The ladle is then released to draw stock from below the oil layer out of the proximal end of the tube. The tube is wider at the proximal end so the ladle is easy drawn upward.

BRIEF DESCRIPTION OF THE FIGURES

For a more complete understanding of the present disclosure and one or more examples of the features and advantages of the present disclosure, reference is now made to the following description, taken in conjunction with the accompanying drawings, in which.

DETAILED DESCRIPTION

Embodiments of the present disclosure are best understood by referring to FIGS. 1-9C of the drawings, like numerals being used for like and corresponding parts of the various drawings.

Certain food items may develop an undesirable surface layer as they cook. For example, stews and stocks may develop a layer of oil and/or fat as they are cooked (e.g., fat may be rendered from the flesh of the meat, poultry, and/or fish included in the stew or stock as it simmers). As another example, some vegetarian dishes may develop an unpleasant appearing floating scum, or simply an oil layer from butter or cooking oils used to sweat onions or caramelize vegetables (e.g., before adding fluids, like water or stock).

Typical methods, devices, and apparatuses for removing this undesirable surface layer, however, may be deficient. For example, typical methods of removing fat or oil from stock, stew, or soup have involved pouring the cooked stock, stew, or soup out of the cooking vessel and into special devices that have spouts that feed from below the surface or that have a tap or spigot near the bottom of the special device. An additional example of a typical method involved chilling the cooking vessel (and the cooked stock, stew, or soup) so that the fat can solidify and then be removed piece by piece. Unfortunately, these typical methods, devices, and apparatuses tend to be cumbersome, inconvenient, and/or also tend to impose additional costs or restraints on the cook, whom would prefer to be able to draw clear stock, stew, or soup (e.g., free of oil, fat, or other undesirable matter) from an ordinary cooking vessel.

The ladle and container system(s) 100 of FIGS. 1-9C may address one or more of the deficiencies of these methods, devices, and apparatuses for removing this undesirable surface layer. For example, the ladle and container system(s) 100 include a container 110 and a ladle 120. This container 110 may include a second opening 112 that may be substantially sealed by the cup 130 of the ladle 120 (e.g., by the outer surface 130b of the cup 130). This substantial sealing of the second opening 112 may allow the container 110 to be inserted into a food item (e.g., stock, stew, or soup) while it is cooking or simmering in the original cooking pot or vessel. When the second opening 112 is below the undesirable surface layer of the food item, the second opening 112 may be unsealed (e.g., by lifting up or moving the ladle 120), allowing a portion of the food item to flow into the hollow interior 114 of the container 110. Because the second opening 112 is already below the undesirable surface layer of the food item, the portion that flows into the hollow interior 114 of the container 110 (i.e., the separated food item) may not include any (or most) of the undesirable surface layer. The ladle 120 may then be used to retrieve the separated food item from within the container 110. As such, the ladle and container system 100 may allow a user to retrieve the food item (e.g., stock, stew, or soup) directly from the cooking vessel or pot, and the retrieved food item may be free (or substantially free) of fat, oil, or other undesirable matter that typically floats on the surface of the cooked food item, in some examples. This may allow the separated food item (i.e., the food item without all or portion of the undesirable surface layer) to be retrieved from the cooking pot or vessel while the remainder of the food item continues to simmer (or otherwise cook). As such, the separated food item may be more easily sampled, added to additional dishes, or readied for serving. Additionally, the food item may be retrieved from any cooking vessel or pot using the ladle 120, which is generally conventional and familiar to use.

FIGS. 1-6 illustrate examples of a ladle and container system 100. As is illustrated, the ladle and container system 100 comprises a container 110 and a ladle 120. The container 110 may be a hollow container that may be insertable into a food item (e.g., hot soup, hot stock, hot stew).

In the illustrated examples, the container 110 includes a proximal end 110p and an opposing distal end 110d. The proximal end 110p may define the vertically uppermost portion of the container 110, when the container 110 is positioned with the proximal end 110p facing upward (and the distal end 110d facing downward). The distal end 110d may define the vertically lowermost portion of the container 110, when the container 110 is positioned with the proximal end 110p facing upward (and the distal end 110d facing downward). The proximal end 110p may be positioned any vertical distance from the distal end 110d. For example, the vertical distance in-between the proximal end 110p and the distal end 110d may be or may be substantially (e.g., +/−10%) 3 inches, 4 inches, 5 inches, 6 inches, 7 inches, 8 inches, 9 inches, 10 inches, 11 inches, 12 inches, 18 inches, 24 inches, 36 inches, any other any other vertical distance, or any vertical distance (or range of vertical distances) in-between 3 inches and 24 inches.

The container 110 may further include a first opening 111 positioned at the proximal end 110p, and a second opening 112 positioned at the distal end 110d. The first opening 111 may allow one or more items to be inserted into (and removed from) a hollow interior of 114 of the container 110. For example, the first opening 111 may allow a cup 130 of the ladle 120 to be inserted into the hollow interior 114 of the container 110, and may further allow the cup 130 of the ladle 120 to be removed from the hollow interior 114 of the container 110. This may allow the ladle 120 to be used to scoop (or otherwise retrieve) food items out of the container 110. It may further allow the ladle 120 to be used to substantially seal the second opening 112 of the container 110, as is discussed below. The first opening 111 may have any shape and/or size. For example, the first opening 111 may be shaped as a circle, an oval, a square, a rectangle, a diamond, an irregular shape, any other shape, or any combination of the preceding. As another example, the first opening 111 may have a width (or diameter) of or substantially of (e.g., +/−10%) 2 inches, 2.5 inches, 3 inches, 3.5 inches, 4 inches, 4.5 inches, 5 inches, 6 inches, 12 inches, any other distance, or any distance (or range of distances) in-between 2 inches and 12 inches.

The second opening 112 may allow food items (e.g., hot soup, hot stock) to enter the hollow interior 114 of the container 110. For example, when the container 110 is positioned (with the distal end 110d positioned downward and the proximal end 110p positioned upward) within a pot or vessel that includes a liquid food item, the second opening 112 may provide an opening through which the liquid food item may enter the hollow interior 114 of the container 110. The second opening 112 may have any shape and/or size. For example, the second opening 112 may be shaped as a circle, an oval, a square, a rectangle, a diamond, an irregular shape, any other shape, or any combination of the preceding. As another example, the second opening 112 may have a width (or diameter) of or substantially of (e.g., +/−10%) 1 inch, 2 inches, 2.5 inches, 3 inches, 3.5 inches, 4 inches, 4.5 inches, 5 inches, 6 inches, 11 inches, 11.5 inches, any other distance, or any distance (or range of distances) in-between 1 inch and 11.5 inches.

In some examples the first opening 111 may have a size that is bigger than the second opening 112. For example, the first opening 111 may have a width (or diameter) that is bigger than that of the second opening 112. This smaller size of the second opening 112 may allow the ladle 120 to be used to substantially seal the second opening 112 of the container 110 when desired. Additionally, the larger size of the first opening 111 may allow the ladle 120 to be inserted into the container 110 when desired. The first opening 111 may have a size that is bigger than the second opening 112 by any amount. For example, the first opening 111 may have a width (or diameter) that is bigger than that of the second opening 112 by or substantially by (e.g., +/−10%) 0.25 inches, 0.5 inches, 1 inch, 1.5 inches, 2 inches, 2.5 inches, 3 inches, 6 inches, any other distance, or any distance (or range of distances) in-between 0.25 inches and 6 inches.

As is also illustrated, the container 110 further includes a sidewall 113 that extends from the proximal end 110p to the distal end 110d of the container 110. The sidewall 113 may have an external surface 113a that defines a horizontally outermost portion of the sidewall 113, and an internal surface 113b that defines a horizontally innermost portion of the sidewall 113. The sidewall 130 may have any thickness.

Figure 1:
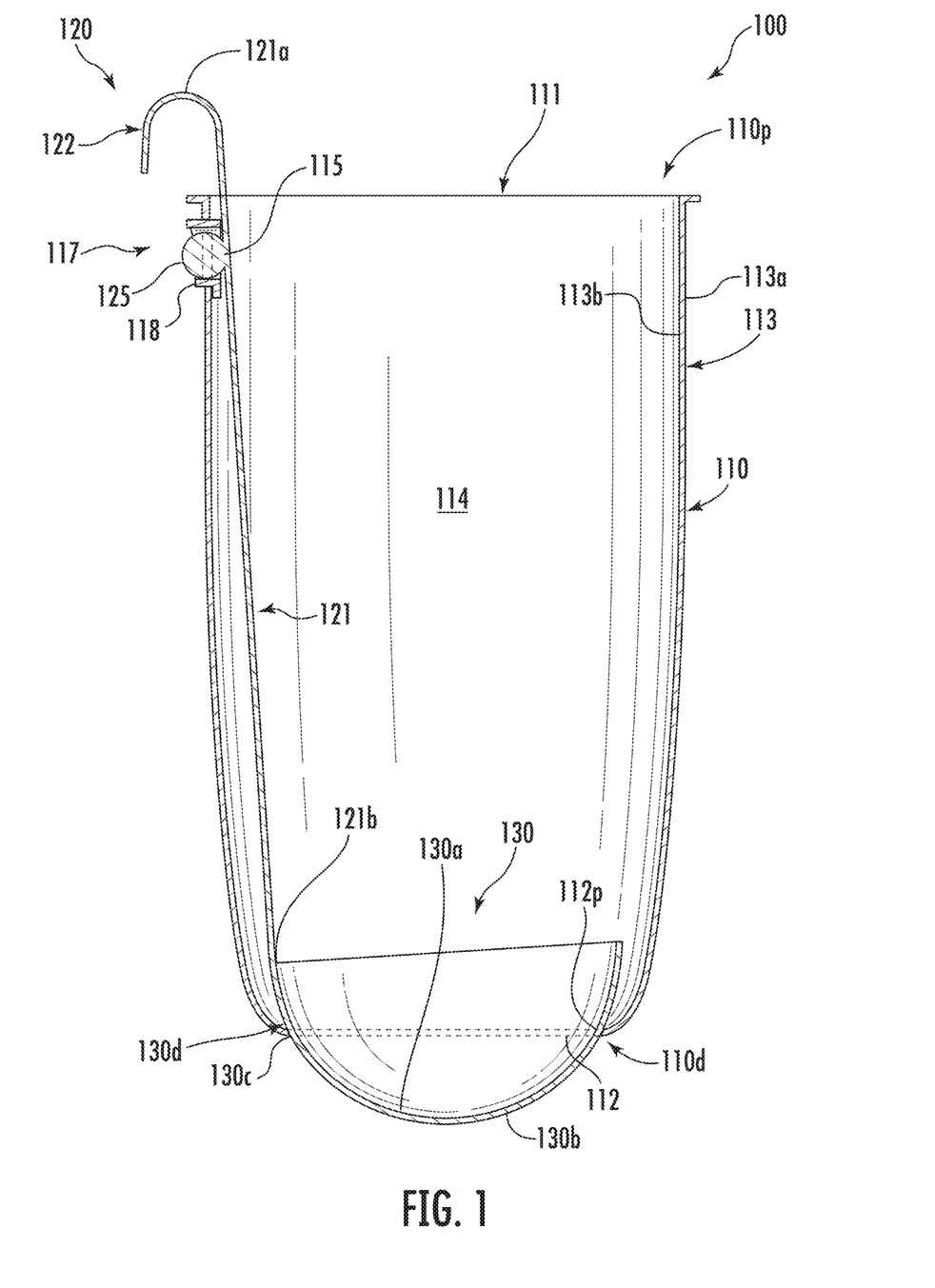
FIG. 1 is a cross-sectional view of one example of a ladle and container system.

The sidewall 113, the external surface 113a, and/or the internal surface 113b may have any shape. For example, the sidewall 113, the external surface 113a, and/or the internal surface 113b may be curvilinear. In such an example, the sidewall 113, the external surface 113a, and/or the internal surface 113b may have one or more curves. This may, in some examples, allow the sidewall 113 to curve outward from the smaller second opening 112 to the bigger first opening 111, as is illustrated in FIG. 1. The sidewall 113, the external surface 113a, and/or the internal surface 113b may have any degree of curvature. Additionally, the curvature may be convex, concave, any other type of curvature, or any combination of the preceding. Furthermore, the degree of curvature and/or the type of curve (e.g., convex, concave) may change over the vertical length of the sidewall 113. In some examples, only a portion of the sidewall 113, the external surface 113a, and/or the internal surface 113b may be curvilinear. The other portion(s) may be flat, or any other shape.

As another example, the sidewall 113, the external surface 113a, and/or the internal surface 113b may be non-curvilinear. For example, the external surface 113a and the internal surface 113b may be flat. As an example of this, the sidewall 113 may be flat and may extend upward from the smaller second opening 112 at an angle to the bigger first opening 111. For example, the sidewall 130 may extend upward at or substantially at (e.g., +/−5 degrees) 90 degrees, 85 degrees, 80 degrees, 70 degrees, 60 degrees, 45 degrees, any other upward extending angle, or any angle (or range of angles) in-between 45 degrees and 90 degrees.

The container 110 may have any shape. For example, the container 110 may be a tube (or tubular) having any cross-sectional shape, such as a circle, an oval, a square, a rectangle, a diamond, an irregular shape, any other shape, or any combination of the preceding. For example, as is illustrated, the container 110 is a tube having a circular cross-sectional shape. Furthermore, the cross-sectional shape (or size) of the tube may change along the vertical length of the sidewall 113. For example, as is also illustrated, the circular cross-sectional shape of the tube may decrease in diameter as it moves closer to the second opening 112.

The container 110 may be made of any material(s) that may be inserted into a food item (e.g., hot soup, hot stock, hot stew). For example, the container 110 may be made of plastic, glass, pottery materials, metal, non-metallic materials, any other material that may be inserted into a food item (e.g., hot soup, hot stock, hot stew), or any combination of the preceding. As is illustrated, the container 110 is made of stainless steel.

As is illustrated, the ladle and container system 100 further comprises the ladle 120. The ladle 120 may be any device or structure that may be insertable into the container 110 so as to retrieve a portion of a food item (e.g., hot soup, hot stock) within the container 110.

In the illustrated example, the ladle 120 comprises a handle 121 that has a proximal end 121a and an opposing distal end 121b. The ladle 120 further comprises a cup 130 coupled to the distal end 121b. The proximal end 121a may define the vertically uppermost portion of the handle 121, when the handle 121 is positioned with the proximal end 121a facing upward (and the distal end 121b facing downward). The distal end 121b may define the vertically lowermost portion of the handle 121, when the handle 121 is positioned with the proximal end 121a facing upward (and the distal end 121b facing downward). The proximal end 121a may be positioned any vertical distance from the distal end 121b. For example, the vertical distance in-between the proximal end 121a and the distal end 121b may be or may be substantially (e.g., +/−10%) 6 inches, 8 inches, 10 inches, 12 inches, 18 inches, 24 inches, 30 inches, 36 inches, any other any other vertical distance, or any vertical distance (or range of vertical distances) in-between 6 inches and 36 inches. In some examples, the handle 121 may be an elongated handle. In some examples, the vertical distance in-between the proximal end 121a and the distal end 121b may cause the proximal end 121a to extend out of and past the first opening 111 of the container 110 (as is illustrated in FIG. 1) when the second opening 112 of the container 110 is substantially sealed by the outer surface 130b of the cup 130 of the ladle 120. Further details regarding this substantial sealing are discussed below.

In some examples, the handle 121 may further include a grip portion 122 coupled to the proximal end 121a, as is illustrated in FIG. 1. The grip portion 122 may descend downward from the proximal end 121a, providing an area that may be easier for a user to grip (even if the ladle 120 is wet and slippery).

The cup 130 coupled to the distal end 121b of the handle 121 may be any device or structure that may hold all portion of a food item (e.g., hot soup, hot stock), so as to allow the portion of the food item to be removed from the container 110. The cup 130 may have any shape and/or size that allows it to fit within the hollow interior 114 of the container 130. For example, the cup 130 may have an outer perimeter that is shaped as a circle, an oval, a square, a rectangle, a diamond, an irregular shape, any other shape, or any combination of the preceding. As another example, the cup 130 may have a width (or diameter) of or substantially of (e.g., +/−10 percent) 2 inches, 2.5 inches, 3 inches, 3.5 inches, 4 inches, 4.5 inches, 5 inches, 6 inches, 8 inches, any other distance, or any distance (or range of distances) in-between 2 inches and 8 inches. In some examples, the width (or diameter) of the cup 130 may be less than the width (or diameter) of the first opening 111, but may be greater than the width (or diameter) of the second opening 112. This may allow the cup 130 to be easily inserted into the hollow interior 114 of the container 110 through the first opening 111, and may further allow the cup 130 to substantially seal the second opening 112.

As is illustrated, the cup 130 includes an inner surface 130a and an outer surface 130b. The inner surface 130a is configured to hold (or otherwise retain) all or a portion of a food item. For example, the inner surface 130a may be configured to hold (or otherwise retain) a solid food item (e.g., a piece of meat, a noodle), a liquid food item (e.g., soup, stock, water), or both (e.g., a portion of chicken noodle soup). The inner surface 130a may be configured in any manner that allows it to hold all or a portion of a food item. For example, the inner surface 130a may be bowl-shaped, cup-shaped, or container-shaped. As an example of this, the inner surface 130a may have a bottom portion that is positioned vertically lower than side portions that extend upward from the bottom portion and that enclose the bottom portion. This bowl-shape, cup-shape, or container-shape may create a structure that can hold a food item in the bottom portion, and that can further temporarily trap the food item in the bottom portion using the upward extending side portions. As a further example, the inner surface 130a may be solid, preventing the portion of the food item from dripping (or otherwise falling) out of the inside of the inner surface 130a. Also, as is illustrated, the inner surface 130a may face upward, when the handle 121 is positioned with the proximal end 121a facing upward (and the distal end 121b facing downward). This may allow the inner surface 130a to hold (or otherwise retain) all or a portion of a food item, when the handle 121 is positioned with the proximal end 121a facing upward (and the distal end 121b facing downward). It may also cause the inner surface 130a to face all or a portion of the proximal end 121a.

The inner surface 130a may have any shape and/or size that allows it to hold (or otherwise retain) all or a portion of a food item. For example, the inner surface 130a may be concave. This concave shape may curve inward, forming a bowl-like or cup-like surface that can hold a portion of a food item within the inward curve. As another example, the inner surface 130a may not be curved at all. Instead, it may be made of a flat bottom and one or more upward extending surfaces (e.g., flat) that form an indent that can hold a portion of a food item (e.g., a cylinder shape with no top, a cube shape with no top). As is illustrated, the inner surface 130a of FIG. 1 is solid concave inner surface.

The outer surface 130b is configured to substantially seal the second opening 112 of the container 110 from within the hollow interior 114 of the container 110. For example, the outer surface 130b may be configured so that when the outer surface 130b is positioned within the second opening 112 of the container 110 (while at least a portion of the cup 130 is positioned within the hollow interior 114 of the container 110), the outer surface 130b may block the second opening 112. This blocking of the second opening 112 may prevent all (or most) of the food item within a pot or vessel from flowing into the hollow interior 114 of the container 110. As such, this blocking of the second opening 112 may substantially seal the second opening 112. This substantially sealed second opening 112 may not, in some examples, prevent all of the food item from flowing into the hollow interior 114 of the container 110. Instead, it may only prevent most of the food item from flowing into the hollow interior 114 of the container 110. A small portion (e.g., drops) of the food item may still seep into the hollow interior 114 while the second opening 112 is substantially sealed. In other examples, this substantially sealed second opening 112 may prevent all of the food item from flowing into the hollow interior 114 of the container 110.

The outer surface 130b may be configured in any manner that allows it to substantially seal the second opening 112 of the container 110 (from within the hollow interior 114 of the container 110). For example, a portion of the outer surface 130b may have a cross sectional shape and size that matches the shape and size of the second opening 112 of the container 110. As an example of this, if the second opening 112 is circular with a diameter of 3 inches, a portion of the outer surface 130b may have a cross sectional shape that is circular and that has a diameter of 3 inches (or 3 inches +/−10 percent). This may allow that portion of the outer surface 130b to tightly fit within (and against the perimeter 112p of) the second opening 112, allowing the outer surface 130b to block the second opening 112 (and substantially sealing the second opening 112). An example of this tight fit is seen in FIG. 1, where the portion 130c of the outer surface 130b tightly fits within (and against the perimeter 112p of) the second opening 112. In a further example, the outer surface 130b may also have another portion that has a cross sectional shape and size that is bigger than the size of the second opening 112 of the container 110. This other portion may be positioned directly above portion 130c of the outer surface 130b. As such, this other portion (illustrated in FIG. 1 as portion 130d) may not fit within the second opening 112. Instead, this other portion 130d may press down against a portion of the internal surface 113b of the container 110, which may further substantially seal the second opening 112 of the hollow container 110.

The outer surface 130b may have any shape and/or size that allows it to substantially seal the second opening 112 of the container 110 (from within the hollow interior 114 of the container 110). For example, the outer surface 130b may be convex. This convex shape may curve outward, allowing a portion of the outer surface 130b to extend out of the bottom of the second opening 112 when the outer surface 130b is substantially sealing the second opening 112 of the container 110. As another example, the outer surface 130b may not be curved at all. Instead, it may be made of one or more straight surfaces that form a protrusion (or other form) that can substantially seal the second opening 112 of the container 110. As is illustrated, the outer surface 130b of FIG. 1 is solid convex outer surface.

The ladle 120 may be made of any material(s) that may be inserted into a food item (e.g., hot soup, hot stock, hot stew), and that may further hold the food item. For example, the ladle 120 may be made of plastic, glass, pottery materials, metal, non-metallic materials, any other material that may be inserted into a food item (e.g., hot soup, hot stock, hot stew) and that may further hold the food item, or any combination of the preceding. As is illustrated, the ladle 120 is made of stainless steel.

As is illustrated, the ladle and container system 100 further comprises a locking system 117. The locking system 117 may be any device or structure that may selectively lock (or otherwise hold) the ladle 120 in a position relative to the container 110 so that the outer surface 130b of the cup 130 substantially seals the second opening 112. In some examples, the locking system 117 may be any device or structure that allows the ladle 120 to be removably engaged with the container 110 so that the outer surface 130b of the cup 130 is held in a position where it substantially seals the second opening 112 of the container 110.

The locking system 117 may allow a portion of the handle 121 to be removably attachable to a portion of the container 110, in some examples. This removable attachment may hold the cup 130 of the ladle 120 in a position where the outer surface 130b substantially seals the second opening 112 of the container 110. For example, when the attachment is engaged, the attachment may apply downward pressure on the handle 121 (and/or may prevent upward movement of the handle 121), causing the portion 130c of the outer surface 130b to tightly fit within the second opening 112. In such an example, the outer surface 130b may continue to substantially seal the second opening 112 until the removable attachment is removed (or otherwise un-engaged). When the attachment is removed, the ladle 120 may once again be moved relative to the container 110. This may, in some examples, allow the ladle 120 to be used to retrieve at least a portion of the food item from within the container 110.

FIG. 1 illustrates one example of such a locking system 117, which includes a knob 125 and a hole 115, which may be used together to selectively lock (or otherwise hold) the ladle 120 (and the cup 130 of the ladle 120) in a position relative to the container 110 so that the outer surface 130b of the cup 130 substantially seals the second opening 112. The knob 125 may be any protrusion that extends outward from an external surface of the handle 121, and that is configured to removably fit within the hole 115. As is illustrated, the knob 125 is positioned adjacent the proximal end 121a of the handle 121. In other examples, the knob 125 may be positioned on any other location of the handle 121 that allows it to removably fit within the hole 115. The hole 115 may be an opening, bore (e.g., round bore), or hole (e.g., mating hole) in the sidewall 113 of the container 110. As is illustrated, the hole 115 is positioned adjacent the proximal end 110p of the container 110. In other examples, the hole 115 may be positioned on any other location of the container 110 that allows it to receive the knob 125.

The knob 125 may be positioned within the hole 115 in order to lock (or otherwise hold) the ladle 120 (and the cup 130 of the ladle 120) in a position relative to the container 110 so that the outer surface 130b of the cup 130 substantially seals the second opening 112. When positioned within the hole, the knob 125 may be held tightly within the hole 115, which may prevent the ladle 120 from being accidentally pushed out of position. To assist in holding the knob 125 within the hole 115, the locking system 117 may further include a gasket 118 that can deform. This gasket 118 may provide deformability (e.g., slight deformability) to the perimeter of the hole 115, in some examples. This gasket 118 may be a ring-shaped (i.e., annular) gasket that surrounds all or a portion of the perimeter of the hole 115, and/or that is secured in an edge of the hole 115. The gasket 118 may reduce the size of the perimeter of the hole 115, which may provide a tighter fit between the knob 125 and the hole 115/gasket 118. The gasket 118 may be made of an elastomer (e.g., silicone rubber), allowing the gasket 118 to deform, in some examples.

To unseal the second opening 112, the knob 125 may be removed from the hole 115. This may allow the ladle 121 to once again be moved relative to the container 110. As such, the ladle 121 may be used to retrieve at least a portion of the food item from within the container 110. In some examples, the knob 125 may latchingly engage with the gasket 118 and/or hole 115 when the knob is positioned within the hole 115. To do so, the knob 125 or the perimeter of the hole 115 (and/or the gasket 118) may be at least slightly deformable. This latching engagement may refer to an engagement that requires an equal or greater force to remove the knob 125 from the hole 115 (i.e., to disengage) than it took to position the knob 125 within the hole 115 (i.e., to create the engagement).

Figure 2:
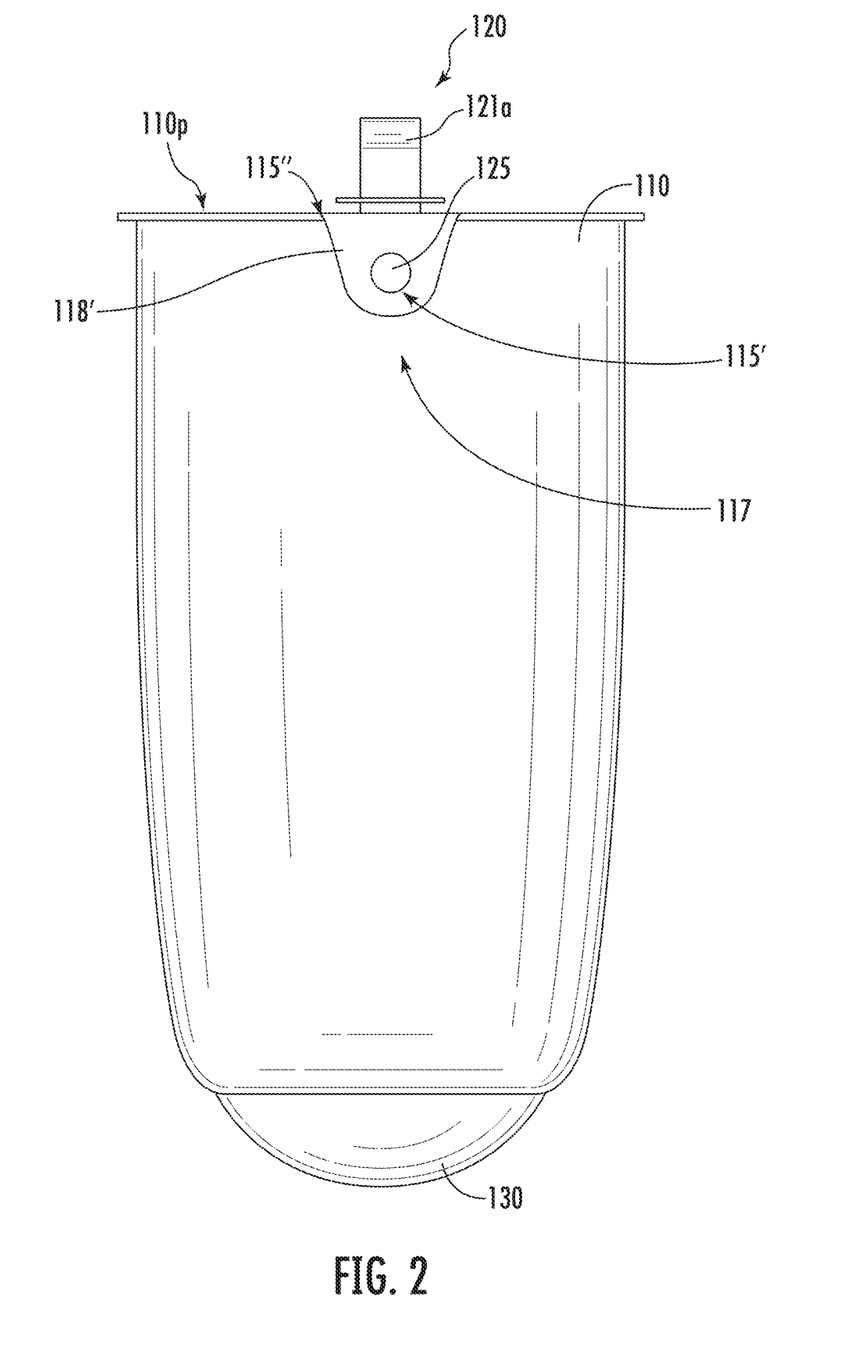
FIG. 2 is a side view of another example of a ladle and container system.
Figure 3:
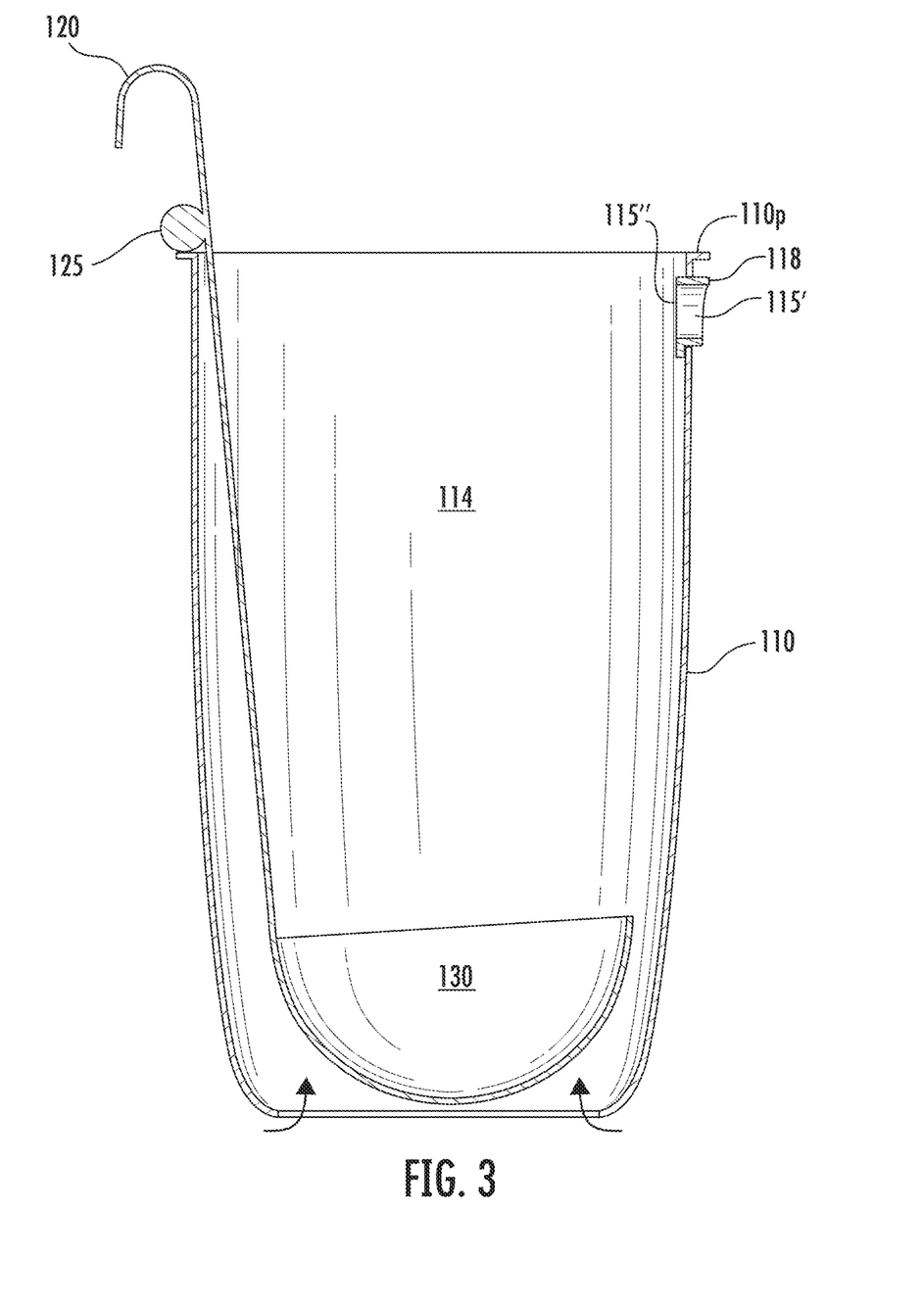
FIG. 3 is a cross-sectional view of the ladle and container system of FIG. 2, taken orthogonally to the view point in FIG. 2.

FIGS. 2-6 illustrate another example of a locking system 117. In FIGS. 2-6, the container 110 may include a notch 115" in the sidewall 113 of the container 110. The notch 115" may extend downward from the proximal end 110p of the container 110. A gasket 118' may be positioned within the notch 115″, so as to fill the notch 115″. Furthermore, a hole 115' may be positioned within the gasket 118' (as opposed to being positioned in the sidewall 113, as is illustrated in FIG. 1). Because the hole 115' is positioned in the gasket 118', the entire perimeter of the hole 115' may be deformable. Furthermore, in FIGS. 2-6, the knob 125 may extend outward from the external surface of the handle 121. This knob 125 may be positioned within the hole 115' in order to lock (or otherwise hold) the ladle 120 (and the cup 130 of the ladle 120) in a position relative to the container 110 so that the outer surface 130*b* of the cup 130 substantially seals the second opening 112, as is described above. Also, to unseal the second opening 112, the knob 125 may be removed from the hole 115', as is also described above. This may allow the ladle 121 to once again be moved relative to the container 110. As such, it may be used to retrieve at least a portion of the food item from within the container 110. An example of this is shown in FIG. 3, which illustrates the knob 125 having been removed from the hole 115' and rotated to an opposing side of the container 110, and further illustrates the ladle 120 being moved upward relative to the container 110.

Another example of the latching system 117 may include a magnetic system where the container 110 and/or handle 121 includes a magnet that causes a portion of the handle 121 to be removably attached (via magnetism) to a portion of the container 110. Additional examples of the latching system 117 may include one or more mating mechanical features that utilize a lock that can be rotated (or otherwise displaced) in order removably attach a portion of the handle 121 to a portion of the container 110, or any other mechanical system that may selectively lock (or otherwise hold) the ladle 120 in a position relative to the container 110 so that the outer surface 130*b* of the cup 130 substantially seals the second opening 112. An example of such a latching system 117 is discussed below with regard to FIG. 8.

Additionally, although the ladle and container system 100 is discussed above as including a latching system 117, in some examples it may not include a latching system 117. Instead, a user may forcibly hold the ladle 120 in a position relative to the container 110, so as to manually cause the outer surface 130*b* to substantially seal the second opening 112. In such an example, the user may stop applying the force in order to remove the substantial seal of the second opening 112.

In an example of operation, a user may desire to retrieve a food item (e.g., heated stock) from a pot or vessel in which the food item is being cooked. To do so, the user may insert the ladle 120 into the hollow interior 114 of the container 110 through the first opening 111. The user may then lock the ladle 120 in a position relative to the container 110 so that the outer surface 130*b* of the cup 130 of the ladle 120 substantially seals the second opening 112 of the container 110. In some examples, this locking may be performed using the locking system 117. For example, the user may position a portion of the outer surface 130*b* of the cup 130 into the second opening 112 (so as to substantially seal the second opening 112), and then the user may insert the knob 125 of the handle 121 into the hole 115 (or hole 115'). In other examples, the user may manually hold the ladle 120 in a position relative to the container 110 so that the outer surface 130*b* of the cup 130 of the ladle 120 substantially seals the second opening 112 of the container 110.

Figure 4:
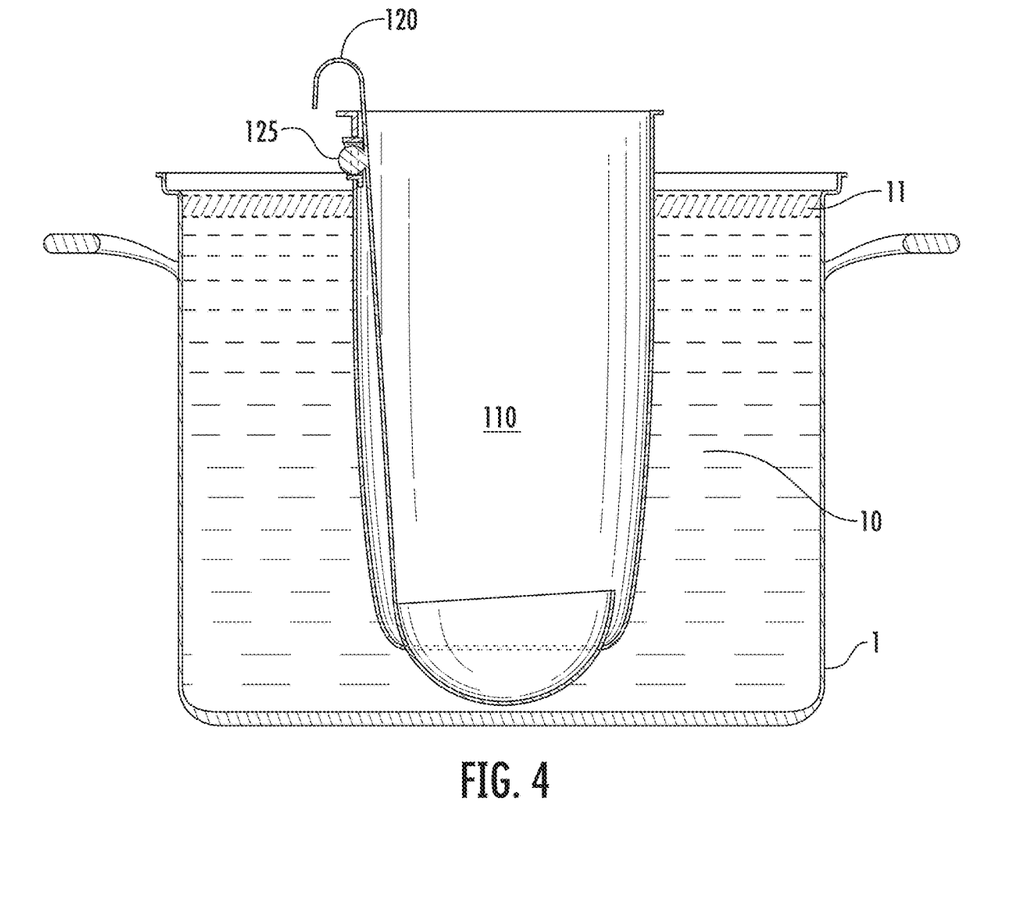
FIG. 4 is a cross-sectional view of the ladle and container system of FIG. 2, with the ladle and container system inserted in a pot or vessel.
Figure 5:
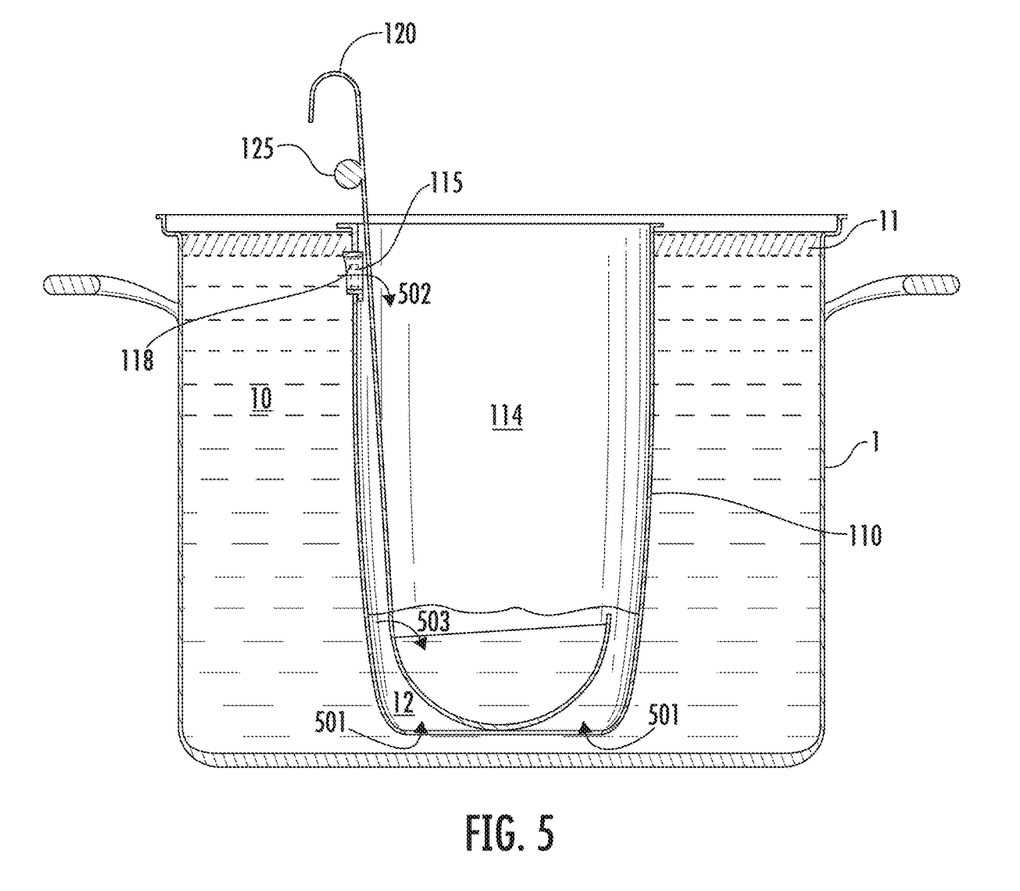
FIG. 5 is a cross-sectional view of the ladle and container system of FIG. 4, with the ladle disengaged from the container.
Figure 6:
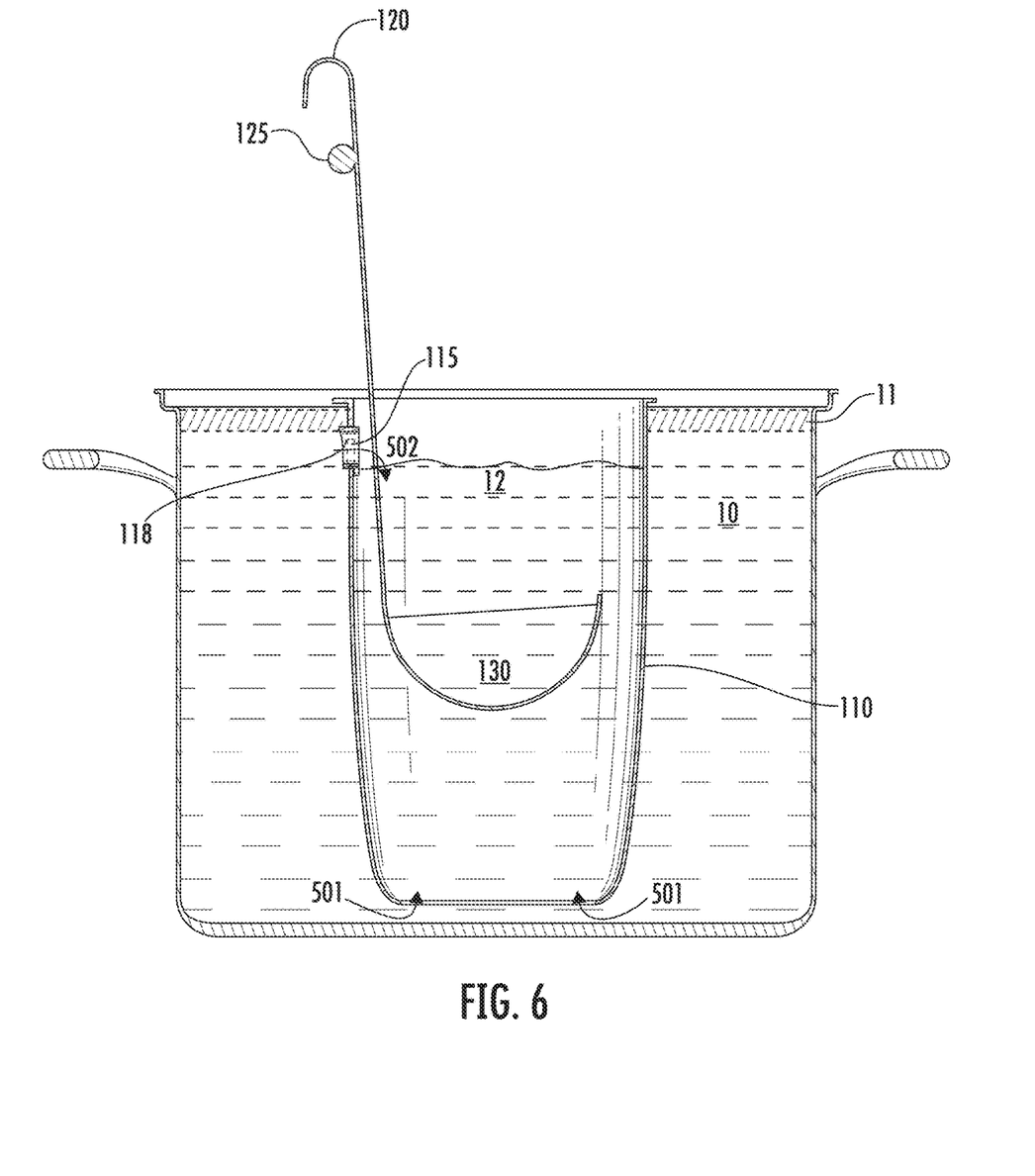
FIG. 6 is a cross-sectional view of the ladle and container system of FIG. 5, where the ladle is being lifted further up out of the pot or vessel.

The distal end 110*d* of the container 110 may then be inserted into the food item 10 (e.g., heated stock) in the pot or vessel 1, as is illustrated in FIG. 4. After the second opening 112 is positioned below the surface layer 11 (e.g., fat, oil, or other undesirable matter) floating on the surface of the food item 10 (e.g., heated stock), the ladle 120 may be unlocked or released (e.g., by removing the knob 125 from the hole 115), allowing the ladle 120 to be moved relative to the container 110. This movement (e.g., upward movement, as is seen in FIG. 5) may unseal the second opening 112. As such, the food item (e.g. heated stock) may flow into the hollow interior 114 of the container 110 (through the second opening 112) from the bottom of the vessel 1 and/or from below the surface layer 11 (e.g., fat, oil, or other undesirable matter). This flow is illustrated as arrows 501 in FIGS. 5-6. In some examples, the food item 10 (e.g., heated stock) may also flow into the hollow interior 114 of the container 110 through the now-open hole 115 (or hole 115'), as is illustrated as arrow 502 in FIGS. 5-6. The food item 10 that flows into the hollow interior 114 of the container 110 may be referred to separated food item 12, as it may not include any (or it may include only a small amount) of the surface layer 11 (e.g., fat, oil, or other undesirable matter). In a preferable example, the container 110 may be held in the food item 10 until the hollow interior 114 is completely or mostly full of the separated fluid 12, as is seen in FIG. 6.

As a result of the flow of the separated food item 10 into the container 110, the separated food item 12 may fill the cup 130 of the ladle 120. The cup 130 may then be lifted out of the container 110, and the cup 130 may be used to pour the separated food item 12 into another container or a serving dish or bowl. In a preferable example, the cup 130 may have a pouring spout 139 (shown in FIG. 8) which may allow the separated food item 12 to be more easily poured out of the cup 130. In such an example, the sidewall 113 may have an outward taper above the second opening 112 to accommodate the pouring spout 139 within the container 110, and to further provide greater clearance for the separated food item 12 to flow into cup 130 as it is raised by the handle 121.

The cup 130 can be repeatedly inserted into the hollow interior 114 of the container 110 to retrieve additional separated food item 12. In some examples, this repeated insertion of the cup 130 may be assisted by first opening 111 being wider than the diameter or width of the cup 130. Once the user is done retrieving the separate food item 12 from the pot or vessel 1, the container 110 may be removed from the pot or vessel 1 for cleaning.

Figure 7:
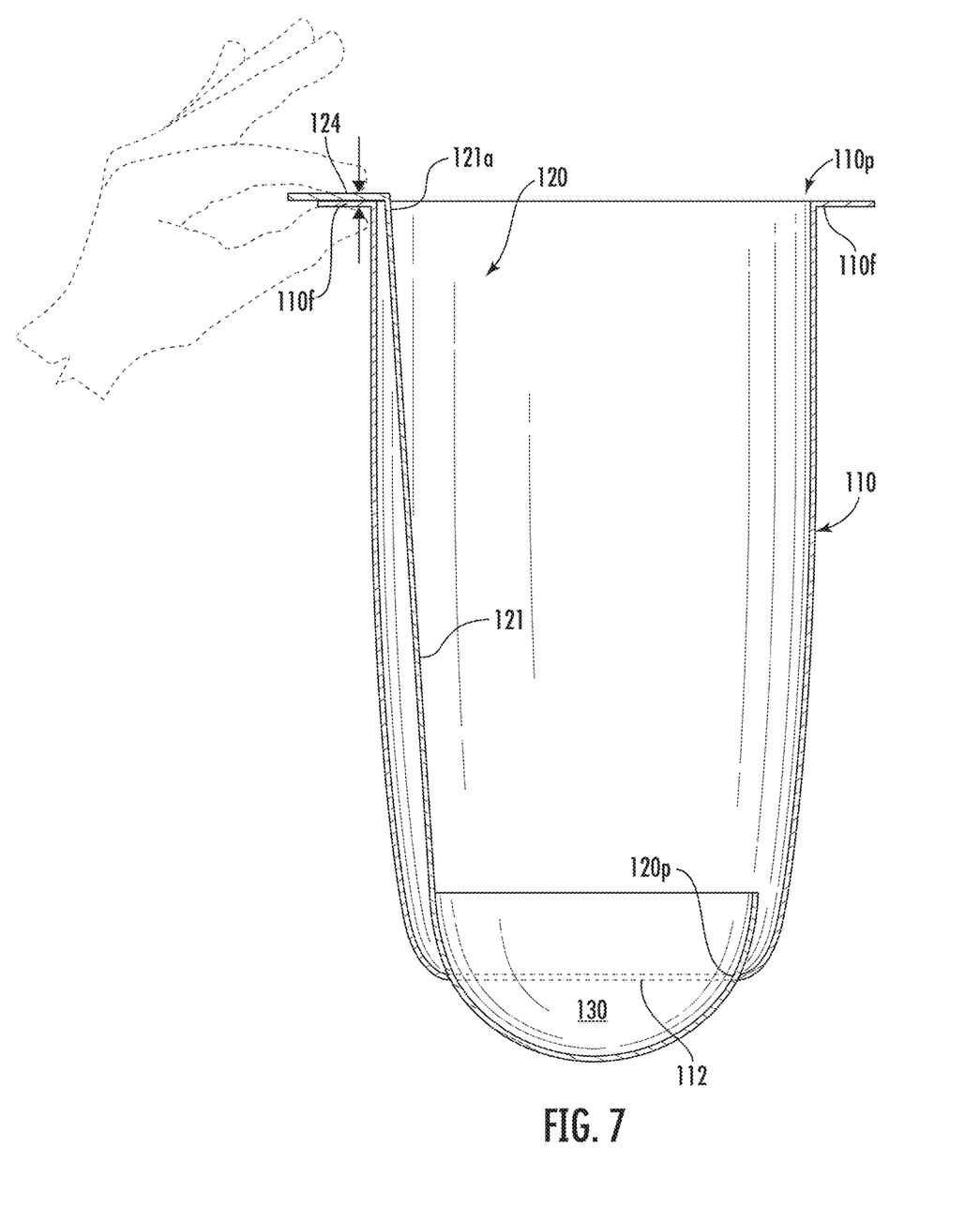
FIG. 7 is a cross-sectional view of another example of a ladle and container system.

FIG. 7 illustrates another example of the ladle and container system 100. As is illustrated, the container 110 further includes a flange 110*f* (e.g., a circular flange) positioned as a rim around the proximal end 110*p* of the container 110. The flange 110*f* may extend laterally out from the external surface 113*a* of the container 110. Additionally, the ladle 120 includes a segment 124 coupled to the proximal end 121*a* of the handle 121. The segment 124 may extend laterally out from the external surface of the handle 121. The segment 124 and flange 110*f* may be used by a user to manually hold the ladle 120 in a position relative to the container 110 so that the outer surface 130*b* of the cup 130 substantially seals the second opening 112. As such, the ladle and container system 100 may not include a locking system 117. Instead, the user can squeeze (or otherwise hold) the segment 124 and flange 110*f* together in order to manually hold the ladle 120 in a position relative to the container 110 so that the outer surface 130*b* of the cup 130 substantially seals the second opening 112. While holding the segment 124 and flange 110*f* together, the user may position the container 110 into the food item 10 within the pot or vessel 1. The user can then release the segment 124 and flange 110*f*, which may unseal the second opening 112 and allow the food item 10 to flow into the hollow interior 114 of the container 110 as separated food item 12.

Figure 8:
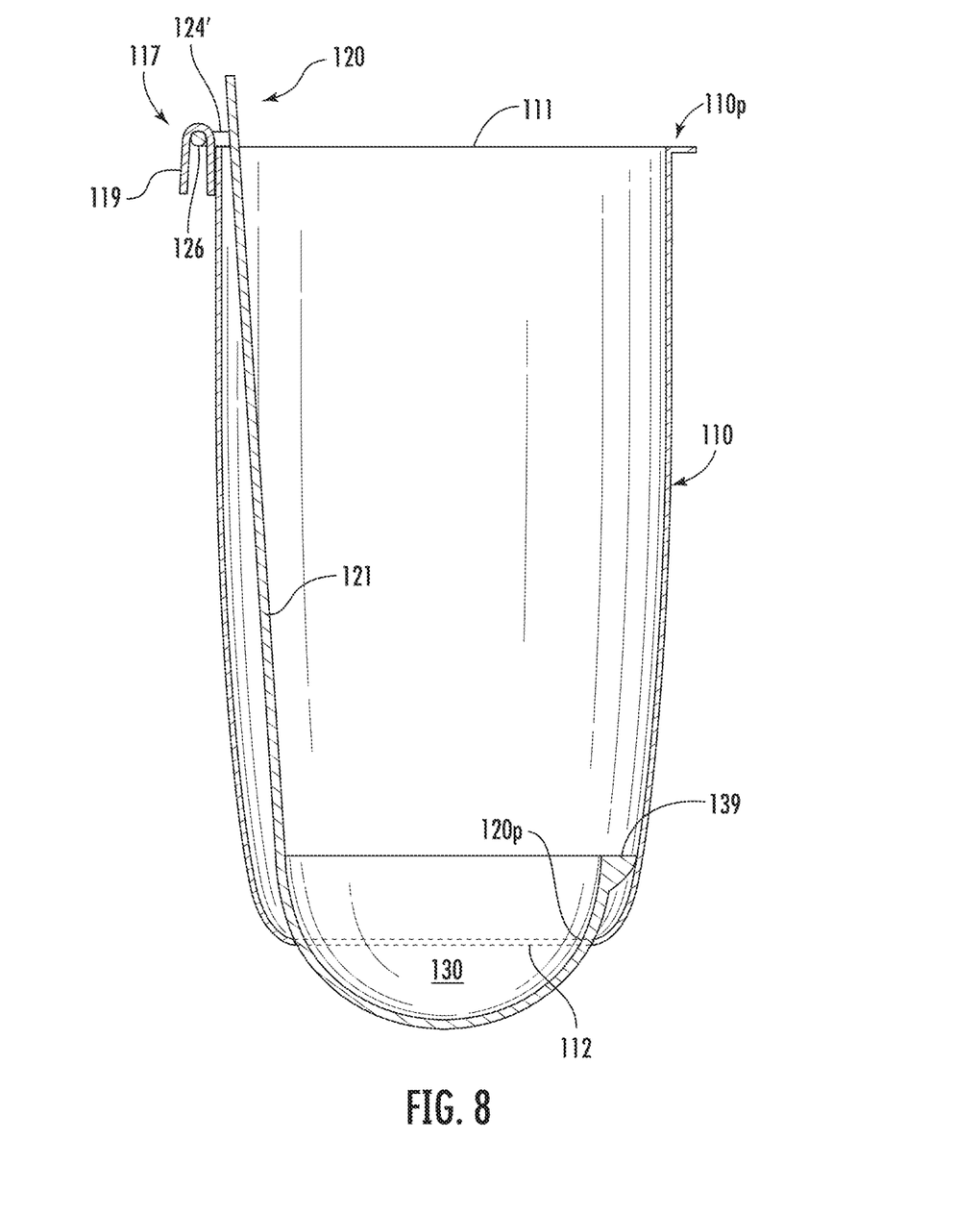
FIG. 8 is a cross-sectional view of another example of a ladle and container system.

FIG. 8 illustrates another example of the ladle and container system 100. As is illustrated, the container 110 further includes a side handle 119, and the ladle 120 further includes a connecting segment 124'. This side handle 119 and connecting segment 124' may be used together as a locking system 117. For example, the connecting segment 124' may terminate in a projection 126 that extends in the tangential direction with respect to the central axis of the container 110. This may allow the projection 126 to be positioned (e.g., via rotation) underneath the curvature of the side handle 119. This positioning of the projection 126 may lock the ladle 120 in a position relative to the container 110 so that the outer surface 130b of the cup 130 substantially seals the second opening 112. In some examples, the projection 126 may optionally have a cross-sectional shape that allows it to matingly engage an underside of the curvature of the side handle 119, as is illustrated in FIG. 8.

When the container 110 is inserted into the food item 10 within the pot or vessel 1, the positioning of the projection 126 underneath the curvature of the side handle 119 may prevent upward movement of the ladle 120, thereby keeping the second opening 112 substantially sealed. After the second opening 112 is positioned below the surface layer 11 (e.g., fat, oil, or other undesirable matter), the user can then rotate (or otherwise displace) the projection 126 out from underneath the side handle 119. This may break the seal, allowing the food item 10 to flow into the hollow interior 114 of the container 110 as separated food item 12.

Figure 9A:
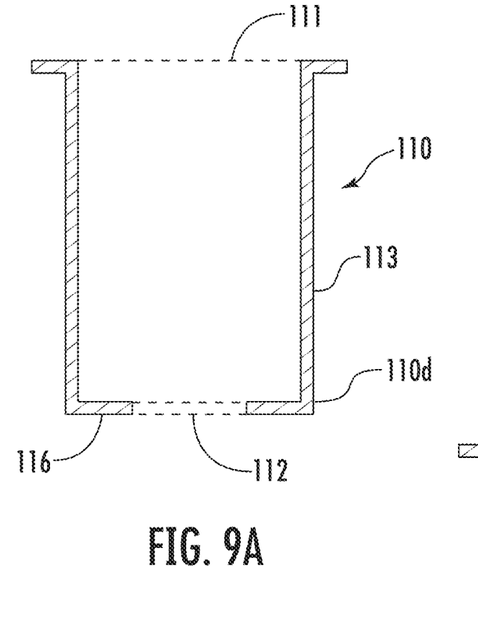
FIGS. 9A-9C are cross-sectional views of example shapes of a container of a ladle and container system.
Figure 9B:
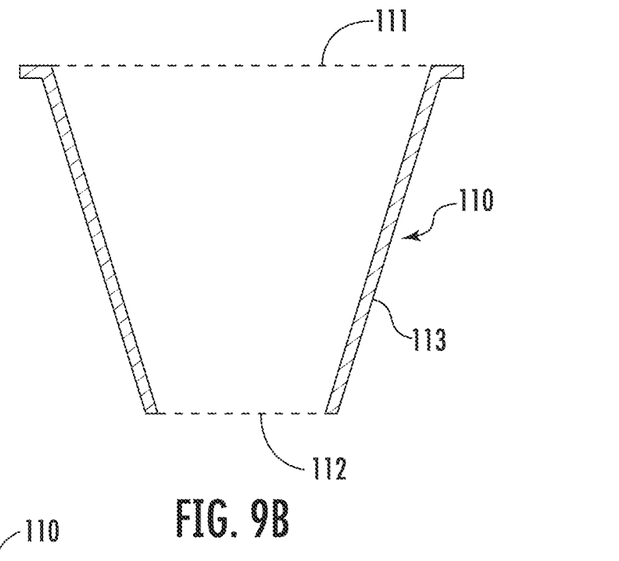
Figure 9C:
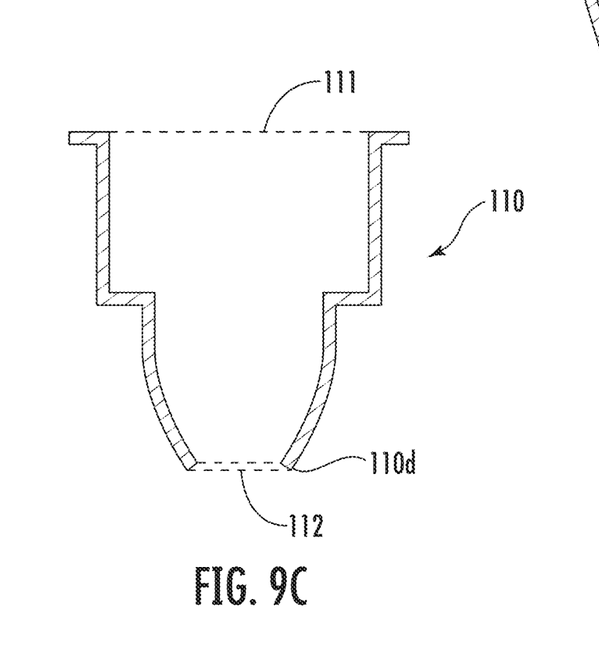

FIGS. 9A-9C illustrate additional shapes of the container 110 of the ladle and container system 100. For example, in FIG. 9A, the container 110 includes a bottom 116 coupled to the sidewall 113 of the container 110 at the distal end 110d of the container 110. Furthermore, the second opening 112 is positioned within the bottom 116. Additionally, the sidewall 113 is flat, with a constant diameter (or width). In FIG. 9B, the sidewall 113 of the container 110 tapers outward at an angle, forming a "V" shape. In FIG. 9C, the sidewall 113 of the container 110 includes a step that decreases the diameter or width of the container 110 near the distal end 110d of the container 110.

Modifications, additions, and/or substitutions may be made to the ladle and container system(s) 100 (or any of the components of the ladle and container system(s) 100) of each of FIGS. 1-9C without departing from the scope of the specification. For example, any of the ladle and container systems 100 (or any of the components of the ladle and container systems 100) of any of FIGS. 1-9C may be combined with or replaced with any of the other ladle and container systems 100 (or any of the components of the ladle and container systems 100) of any of the other FIGS. 1-9C. As another example, the container 110 may include a rim or handle positioned adjacent to the proximal end 110p of the container 110. This rim or handle may be positioned on a ledge of the pot or vessel 1, so as to hold the container 110 in place within the food item 10 in the pot or vessel 1.

The grammatical articles "one", "a", "an", and "the", as used in this specification, are intended to include "at least one" or "one or more", unless otherwise indicated. Thus, the articles are used in this specification to refer to one, or more than one (i.e., to "at least one") of the grammatical objects of the article. By way of example, "a component" means one or more components, and thus, possibly, more than one component is contemplated and may be employed or used in an application of the described embodiments or examples.

Further, the use of a singular noun includes the plural, and the use of a plural noun includes the singular, unless the context of the usage requires otherwise. Additionally, the grammatical conjunctions "and" and "or" are used herein according to accepted usage. By way of example, "x and y" refers to "x" and "y". On the other hand, "x or y" refers to "x", "y", or both "x" and "y", whereas "either x or y" refers to exclusivity.

This specification has been written with reference to various non-limiting and non-exhaustive embodiments or examples. However, it will be recognized by persons having ordinary skill in the art that various substitutions, modifications, or combinations of any of the disclosed embodiments or examples (or portions thereof) may be made within the scope of this specification. Thus, it is contemplated and understood that this specification supports additional embodiments or examples not expressly set forth in this specification. Such embodiments or examples may be obtained, for example, by combining, modifying, or reorganizing any of the disclosed components, elements, features, aspects, characteristics, limitations, and the like, of the various non-limiting and non-exhaustive embodiments or examples described in this specification. In this manner, Applicant reserves the right to amend the claims during prosecution to add features as variously described in this specification.

What is claimed is:

1. A system, comprising:
a) a hollow container having a first opening at a proximal end, a second opening at an opposing distal end, and a sidewall that extends from the proximal end to the distal end, the first opening being wider than the second opening, wherein the hollow container is configured to be positioned within a cooking pot or vessel so as to position at least the second opening of the hollow container below a surface layer of a food item held within the cooking pot or vessel; and
b) a ladle comprising a handle having a proximal end and a distal end, the ladle further comprising a cup coupled to the distal end of the handle, the cup having an unperforated convex outer surface configured to substantially seal the second opening of the hollow container from within the hollow container, wherein a portion of the handle is removably attachable to a portion of the hollow container to selectively hold the cup of the ladle in a position where the convex outer surface substantially seals the second opening of the hollow container, wherein the proximal end of the handle is configured to extend outward out of and past the first opening of the hollow container when the second opening of the hollow container is substantially sealed by the outer surface of the cup, wherein the ladle is configured to selectively release the substantial seal of the second opening of the hollow container while at least the second opening of the hollow container is positioned below the surface layer of the food item, wherein the hollow container is further configured to allow a portion of the food item to move into the hollow container through the second opening when the substantial seal is released while at least the second opening of the hollow container is positioned below the surface layer of the food item, wherein the cup of the ladle has a hollow interior and an opening configured to allow a part of the portion of the food item to be received within the hollow interior of the cup, wherein the cup of the ladle further has an unperforated concave inner surface configured to hold the part of the portion of the food item within the hollow interior of the cup.

2. A system, comprising:
a) a hollow container having a first opening at a proximal end, a second opening at an opposing distal end, and a sidewall that extends from the proximal end to the distal end, the first opening being wider than the second opening, wherein the hollow container is configured to be positioned within a cooking pot or vessel so as to position at least the second opening of the hollow container below a surface layer of a food item held within the cooking pot or vessel; and
b) a ladle comprising a handle having a proximal end and a distal end, the ladle further comprising a cup coupled to the distal end of the handle, the cup having an unperforated outer surface configured to substantially seal the second opening of the hollow container from within the hollow container, wherein the ladle is configured to selectively release the substantial seal of the second opening of the hollow container while at least the second opening of the hollow container is positioned below the surface layer of the food item, wherein the hollow container is further configured to allow a portion of the food item to move into the hollow container through the second opening when the substantial seal is released while at least the second opening of the hollow container is positioned below the surface layer of the food item, wherein the cup of the ladle has a hollow interior and an opening configured to allow a part of the portion of the food item to be received within the hollow interior of the cup, wherein the cup of the ladle further has an unperforated inner surface configured to hold the part of the portion of the food item within the hollow interior of the cup.

3. The system according to claim 2, wherein the inner surface of the cup is a concave inner surface.

4. The system according to claim 2, wherein the outer surface of the cup is a convex outer surface.

5. The system according to claim 2, wherein a portion of the outer surface of the cup has a cross sectional shape and size that matches the shape and size of the second opening of the hollow container.

6. The system according to claim 2, wherein a portion of the handle is removably attachable to a portion of the hollow container to selectively hold the cup of the ladle in a position where the outer surface substantially seals the second opening of the hollow container.

7. The system according to claim 2, wherein the handle includes a knob that extends outward from an external surface of the handle, wherein the knob is configured to removably fit within a hole in the sidewall of the hollow container so as to hold the cup of the ladle in a position where the outer surface substantially seals the second opening of the hollow container.

8. The system according to claim 2, wherein the hollow container includes a notch at the proximal end of the hollow container, wherein a gasket is positioned within the notch, wherein the handle includes a knob that extends outward from an external surface of the handle, wherein the knob is configured to removably fit within a hole in the gasket so as to hold the cup of the ladle in a position where the outer surface substantially seals the second opening of the hollow container.

9. The system according to claim 2, wherein the sidewall of the hollow container is curvilinear.

10. The system according to claim 2, wherein the sidewall of the hollow container is non-curvilinear.

11. The system according to claim 2, wherein the hollow container further includes a bottom coupled to the sidewall at the distal end of the hollow container, wherein the second opening is positioned within the bottom of the hollow container.

12. The system according to claim 2, wherein the proximal end of the handle is configured to extend outward out of and past the first opening of the hollow container when the second opening of the hollow container is substantially sealed by the outer surface of the cup.

13. The system according to claim 2, wherein the cup includes a pouring spout.

14. The system according to claim 2, wherein the hollow container includes a flange that extends laterally out from the sidewall, wherein the ladle includes a segment that extends laterally out from an external surface of the handle, wherein the flange and the segment are configured to be held or squeezed together by a user so as to hold the cup of the ladle in a position where the outer surface substantially seals the second opening of the hollow container.

15. The system according to claim 2, wherein the hollow container includes a handle, wherein the ladle includes a connecting segment, wherein a portion of the connecting segment is configured to be moved underneath the handle so as to hold the cup of the ladle in a position where the outer surface substantially seals the second opening of the hollow container.

16. A method, comprising:
a) substantially sealing a second opening of a hollow container from within the hollow container with an unperforated outer surface of a cup of a ladle, wherein the hollow container has a first opening at a proximal end, the second opening at an opposing distal end, and a sidewall that extends from the proximal end to the distal end, wherein the first opening is wider than the second opening, wherein the ladle comprises a handle having a proximal end and a distal end, wherein the ladle further comprises the cup coupled to the distal end of the handle, the cup having a hollow interior and an opening configured to allow a food item to be received within the hollow interior of the cup, the cup further having an unperforated inner surface configured to hold the food item within the hollow interior of the cup, the cup further having the outer surface;
b) positioning at least the second opening of the hollow container below a surface layer of a food item held within a cooking pot or vessel;
c) releasing the substantial seal of the second opening while at least the second opening of the hollow container is positioned below the surface layer of the food item held within the cooking pot or vessel, wherein the releasing of the substantial seal causes a portion of the food item to move into the hollow container through the second opening; and
d) retrieving at least a part of the portion of the food item from within the hollow container with the inner surface of the cup of the ladle.

17. The method according to claim 16, wherein substantially sealing the second opening of the hollow container comprises removably attaching a portion of the handle to a portion of the hollow container to selectively hold the cup of the ladle in a position where the outer surface substantially seals the second opening of the hollow container.

18. The method according to claim 16, further comprising positioning the cup of the ladle within the hollow container prior to substantially sealing the second opening of the hollow container from within the hollow container with the outer surface of the cup of the ladle.

* * * * *